(12) United States Patent
Komine et al.

(10) Patent No.: US 8,786,352 B2
(45) Date of Patent: Jul. 22, 2014

(54) THRESHOLD COMPUTATION APPARATUS AND THRESHOLD COMPUTATION PROGRAM

(75) Inventors: Toshihiko Komine, Fujimino (JP); Toshiaki Yamamoto, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 174 days.

(21) Appl. No.: 13/402,155

(22) Filed: Feb. 22, 2012

(65) Prior Publication Data

US 2012/0218021 A1 Aug. 30, 2012

(30) Foreign Application Priority Data

Feb. 24, 2011 (JP) ................................. 2011-038202

(51) Int. Cl.
*G06F 7/556* (2006.01)

(52) U.S. Cl.
USPC .......................................................... 327/350

(58) Field of Classification Search
USPC ................................. 327/350–352
See application file for complete search history.

(56) References Cited

U.S. PATENT DOCUMENTS 5,812,008 A * 9/1998 Nigel ............................ 327/350

FOREIGN PATENT DOCUMENTS

| JP | 2002-185998 A | 6/2002 |
| JP | 2008-288627 A | 11/2008 |

OTHER PUBLICATIONS

3GPP TS 36.214 V9.2.0 (Jun. 2010); 3rd Generation Partnership Project; Technical Specification Group Radio Access Network; Evolved Universal Terrestrial Radio Access (E-UTRA); Physical layer; Measurements (Release 9).
3GPP TS 36.331 V9.3.0 (Jun. 2010); 3rd Generation Partnership Project; Technical Specification Group Radio Access Network; Evolved Universal Terrestrial Radio Access (E-UTRA); Radio Resource Control (RRC); Protocol specification (Release 9), pp. 72-78.
3GPP TS 36.304 V9.3.0 (Jun. 2010); 3rd Generation Partnership Project; Technical Specification Group Radio Access Network; Evolved Universal Terrestrial Radio Access (E-UTRA); User Equipment (UE) procedures in idle mode (Release 9).
Japanese Office Action issued Feb. 25, 2014.

* cited by examiner

*Primary Examiner* — Hai L Nguyen
(74) *Attorney, Agent, or Firm* — Morgan, Lewis & Bockius LLP

(57) ABSTRACT

A threshold computation apparatus obtains estimated interference power for an uplink from a terminal to a base station; a predetermined communication quality value necessary for the uplink; a maximum value of transmission power of the terminal; and transmission power of the base station for a downlink from the base station to the terminal. The apparatus subtracts a logarithmic value of the maximum value of the transmission power of the terminal from a logarithmic value of the transmission power of the base station for the downlink; adds a logarithmic value of the communication quality value and a logarithmic value of the estimated interference power to a result of the subtraction; and determines a result of the addition to be a logarithmic value of received power at the terminal; and computes a threshold based on the logarithmic value of the received power at the terminal and predetermined conditions.

5 Claims, 2 Drawing Sheets

# THRESHOLD COMPUTATION APPARATUS AND THRESHOLD COMPUTATION PROGRAM

BACKGROUND OF THE INVENTION

1. Field of the Invention

The present invention relates to a threshold computation apparatus and a threshold computation program.

Priority is claimed on Japanese Patent Application No. 2011-038202, filed Feb. 24, 2011, the contents of which are incorporated herein by reference.

2. Description of the Related Art

In a radio communication system based on LTE (long term evolution) which is one of communication standards, a user terminal receives a pilot signal of a downlink from a base station, and sends the base station measurement information which is called "MR" (Measurement Report) and indicates received power or communication quality of the pilot signal. Based on a result of comparison between the measurement information and a predetermined threshold, the user terminal determines whether or not the measurement information will be sent to the base station (see Non-Patent Documents 1, 2, and 3).

Non-Patent Document 1: 3GPP TS 36.214 v9.2.0 2010-06
Non-Patent Document 2: 3GPP TS 36.331 v9.3.0 2010-06 (see pp. 72-78)
Non-Patent Document 3: 3GPP TS 36.304 v9.3.0 2010-06

The predetermined threshold used in the above determination is computed by the base station, and sent from the base station to the user terminal. The base station computes the threshold based on the measurement information received from the user terminal in advance, or on a value which is predetermined.

The reason for computing the threshold based on the pilot signal for the downlink is that the pilot signal for the downlink is sent by broadcasting from the base station. That is, even a user terminal, which has not been able to be synchronized with the base station in an uplink, can receive a pilot signal for a downlink, and thus the pilot signal for the downlink is convenient for computing received power and communication quality with respect to the relevant user terminal.

Accordingly, the threshold used in the determination by the user terminal whether or not the measurement information will be sent to the base station is computed based on a pilot signal for a downlink.

However, the threshold computed based on a pilot signal for a downlink may not have an appropriate value due to interference power from terminals which access a neighbor base station. If the threshold does not have an appropriate value, measurement information which should be sent is not sent from the user terminal to the base station, or measurement information which should not be sent is sent from the user terminal to the base station. In this case, a process performed based on the measurement information is also not appropriately executed, which may causes an interruption of communication.

SUMMARY OF THE INVENTION

In light of the above circumstances, an object of the present invention is to provide a threshold computation apparatus and a threshold computation program for computing an appropriate threshold.

Therefore, the present invention provides a threshold computation apparatus comprising:

a received power computation unit that:
  obtains estimated interference power that is an estimated value of interference power for an uplink as a communication link from a terminal to a base station; a predetermined communication quality value necessary for the uplink; a maximum value of transmission power of the terminal; and transmission power of the base station for a downlink as a communication link from the base station to the terminal;
  subtracts a logarithmic value of the maximum value of the transmission power of the terminal from a logarithmic value of the transmission power of the base station for the downlink;
  adds a logarithmic value of the communication quality value and a logarithmic value of the estimated interference power to a result of the subtraction; and
  determines a result of the addition to be a logarithmic value of received power at the terminal; and
a threshold computation unit that computes a threshold based on the logarithmic value of the received power at the terminal and a predetermined condition.

In a typical example, the threshold computation unit sends the threshold via a communication apparatus to the terminal, where the threshold is used in a determination as to whether or not the terminal will send the base station, information necessary for a determination as to whether or not a handover process should be executed.

In another typical example, the threshold computation unit sends the threshold via a communication apparatus to the terminal, where the threshold is used in a determination as to whether or not the terminal will select a base station which the terminal accesses.

In another typical example, the threshold computation unit sends the threshold via a communication apparatus to the terminal, where the threshold is used in a determination as to whether or not the terminal will send the base station, information used in a determination as to whether or not a different system or a different frequency band should be searched for by the terminal.

The present invention also provides a threshold computation program that makes a computer execute:

a received power computation process that:
  obtains estimated interference power that is an estimated value of interference power for an uplink as a communication link from a terminal to a base station; a predetermined communication quality value necessary for the uplink; a maximum value of transmission power of the terminal; and transmission power of the base station for a downlink as a communication link from the base station to the terminal;
  subtracts a logarithmic value of the maximum value of the transmission power of the terminal from a logarithmic value of the transmission power of the base station for the downlink;
  adds a logarithmic value of the communication quality value and a logarithmic value of the estimated interference power to a result of the subtraction; and
  determines a result of the addition to be a logarithmic value of received power at the terminal; and
a threshold computation process that computes a threshold based on the logarithmic value of the received power at the terminal and a predetermined condition.

The present invention also provides a non-transitory computer-readable storage medium which stores a threshold computation program that makes a computer execute:

a received power computation process that:
  obtains estimated interference power that is an estimated value of interference power for an uplink as a communication link from a terminal to a base station; a predetermined communication quality value necessary for the uplink; a maximum value of transmission power of the terminal; and transmission power of the base station for a downlink as a communication link from the base station to the terminal;

subtracts a logarithmic value of the maximum value of the transmission power of the terminal from a logarithmic value of the transmission power of the base station for the downlink;

adds a logarithmic value of the communication quality value and a logarithmic value of the estimated interference power to a result of the subtraction; and determines a result of the addition to be a logarithmic value of received power at the terminal; and a threshold computation process that computes a threshold based on the logarithmic value of the received power at the terminal and a predetermined condition.

DETAILED DESCRIPTION OF THE INVENTION

First Embodiment

A first embodiment of the present invention will be described in detail with reference to the drawings. In the first embodiment, a threshold for a determination as to whether or not a base station makes a terminal execute a handover process will be explained. Additionally, in the following explanations, LTE (a communication standard) is used in a radio communication system.

First, general operation of the radio communication system will be explained.

Figure 1:
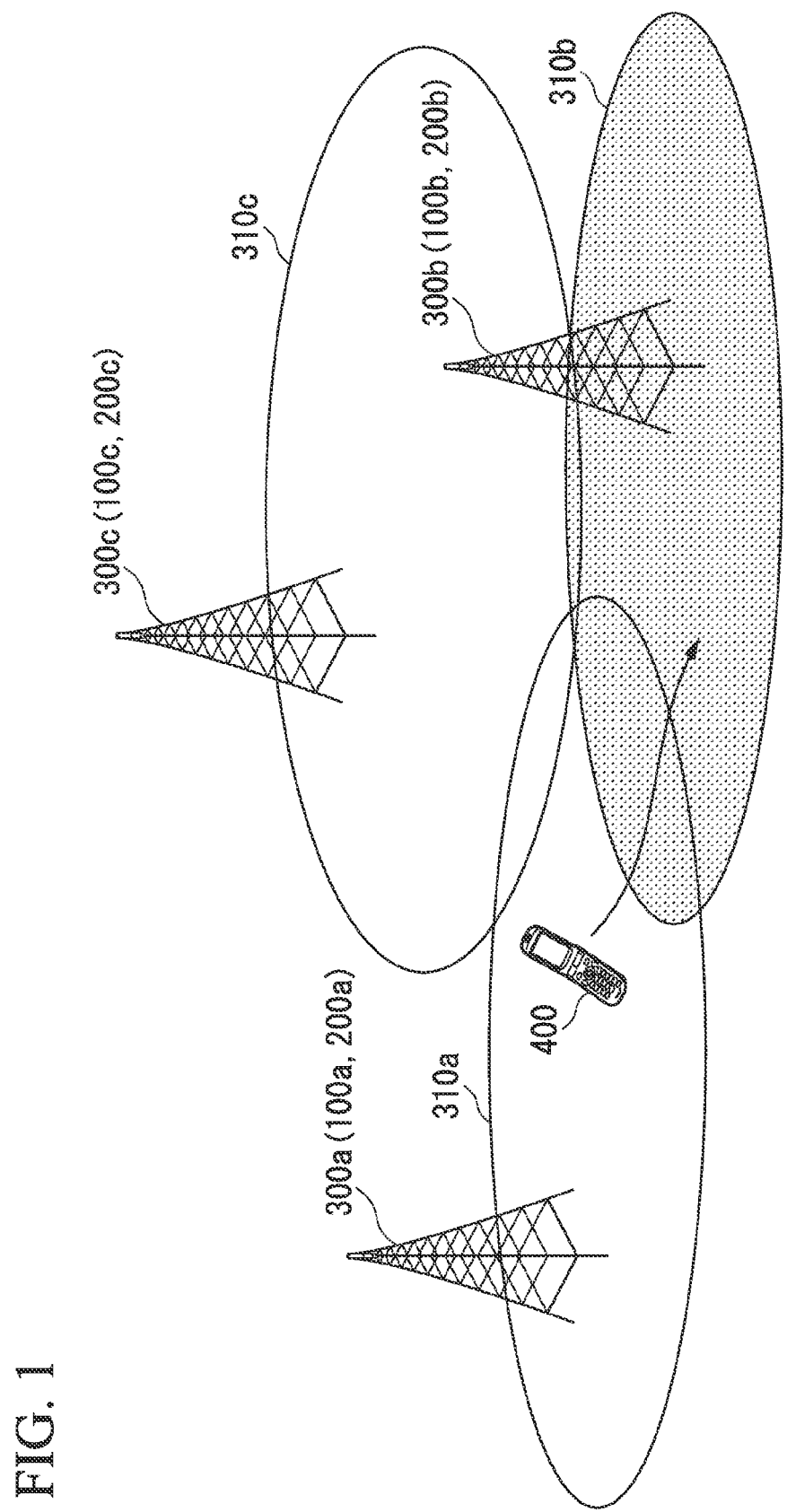
FIG. 1 is a diagram showing the configuration of a radio communication system relating to an embodiment of the present invention.

FIG. 1 shows the configuration of the radio communication system which has base stations 300a, 300b, and 300c, where the number of the base stations is just an example.

The base station 300a has a threshold computation apparatus 100a and a communication apparatus 200a, and forms a cell 310a as a possible communication range by the communication apparatus 200a.

The base station 300b has a threshold computation apparatus 100b and a communication apparatus 200b, and forms a cell 310c as a possible communication range by the communication apparatus 200b.

The base station 300c has a threshold computation apparatus 100c and a communication apparatus 200c, and forms a cell 310c as a possible communication range by the communication apparatus 200c.

It is assumed that a user terminal 400 is present within the cell 310a, and is communicating with the base station 300a while moving toward the cell 310b. That is, the user terminal 400 sends predetermined data to the base station 300a by using an uplink (i.e., communication link from the present terminal to the base station 300a) while moving toward the cell 310b. It is also assumed that the user terminal 400 receives predetermined data from the base station 300a by using a downlink (i.e., communication link from the base station 300a to the present terminal).

The threshold computation apparatus 100a receives the predetermined data (sent from the user terminal 400) via the communication apparatus 200a, and measures momentary interference power for the uplink, based on the received predetermined data. The threshold computation apparatus 100a also computes a threshold for a determination as to whether or not a handover process is to be executed, and sends the computed threshold to the user terminal 400 via the communication apparatus 200a.

The user terminal 400 receives the threshold computed by the threshold computation apparatus 100a, and performs the relevant determination based on the threshold received from the threshold computation apparatus 100a. The user terminal 400 sends measurement information to the base station 300a only when it is determined that the measurement (MR) information should be sent to the base station 300a.

Only when receiving the measurement information from the user terminal 400 the base station 300a sends the base station 300b a signal for inquiring whether or not the user terminal 400 can be handed over (to the base station 300b). If the base station 300b permits the handover of the user terminal 400 the base station 300a sends the user terminal 400 information which indicates the permission of the handover of the user terminal 400 to the base station 300b. The user terminal 400 executes the relevant handover process only when it is permitted.

Therefore, if the threshold does not have an appropriate value, the user terminal 400 cannot send the measurement information to the base station 300a at an appropriate time. If the measurement information is not sent to the base station 300a at an appropriate time, the base station 300a cannot permit the relevant handover process at an appropriate time. Furthermore, if the base station 300a cannot permit the handover process at an appropriate time, the user terminal 400 cannot execute the handover process at an appropriate time, which causes an interruption of communication.

Next, determination as to whether or not the user terminal sends the measurement information, which indicates received power or communication quality for the downlink, to the base station will be explained.

In a radio communication system using LTE, a handover process is executed when a base station receives measurement information, which is sent from a user terminal based on received power (RSRP: Reference Signal Received Power) or communication quality (RSRQ: Reference Signal Received Quality) of a pilot signal for a downlink.

More specifically, based on a pilot signal (CRS: Cell-Specific Reference Signal) sent from the base station via a downlink, the user terminal measures at least one of the received power and the communication quality (value) of the pilot signal.

If a measured value satisfies a predetermined condition, the user terminal sends the corresponding measurement information to the base station. The predetermined condition may be such that the measured value is larger than a fixed threshold, or that the measured value is smaller than a fixed threshold. The predetermined condition may also be such that a difference between a value measured at a base station (called an "access base station") to which the present terminal is accessing by communication and a value measured at a base station (called a "neighbor base station") adjacent to the access base station is smaller than a fixed value.

Such a condition is individually determined for each measurement information type which may be A1MR, A2MR, A4MR, A5MR, B1MR, and B2MR. The followings are examples for the condition used when the user terminal determines whether or not the relevant measurement information is to be sent.

For type A1MR:

$$Ms-Hys>a1\_\text{Threshold} \qquad (1)$$

For type A2MR:

$$Ms + Hys < a2\_Threshold \quad (2)$$

For type A4MR:

$$Mn + Ofn + Ocn - Hys > a4\_Threshold \quad (3)$$

For type A5MR:

$$Ms + Hys < a5\_Threshold1 \quad (4)$$

$$Mn + Ofn + Ocn - Hys > a5\_Threshold2 \quad (5)$$

For type B1MR:

$$Mn + Ofn - Hys > b1\_Threshold \quad (6)$$

For type B2MR:

$$Ms + Hys < b2\_Threshold1 \quad (7)$$

$$Mn + Ofn - Hys > b2\_Threshold2 \quad (8)$$

In the above formulas, Ms denotes received power or communication quality at the access base station; Hys denotes a hysteresis; Mn denotes received power or communication quality at the neighbor base station; Ofn is an offset value in accordance with the relevant frequency; and Ocn is an offset value used by the access base station for a specific neighbor base station.

Ms and Mn are values measured by the user terminal, and Ofn and Ocn are each sent from the relevant base station to the user terminal.

In addition, a1_Threshold is a threshold used in a comparison performed by the user terminal so as to determine whether or not A1MR as measurement information will be sent; a2_Threshold is a threshold used in a comparison performed by the user terminal so as to determine whether or not A2MR as measurement information will be sent; a4_Threshold is a threshold used in a comparison performed by the user terminal so as to determine whether or not A4MR as measurement information will be sent; and a5_Threshold1 and a5_Threshold2 are thresholds used in a comparison performed by the user terminal so as to determine whether or not A5MR as measurement information will be sent.

Additionally, b1_Threshold is a threshold used in a comparison performed by the user terminal so as to determine whether or not B1MR as measurement information will be sent; and b2_Threshold1 and b2_Threshold2 are thresholds used in a comparison performed by the user terminal so as to determine whether or not B2MR as measurement information will be sent.

The above thresholds (for received power or communication quality of a downlink) are sent from the base station to the user terminal.

Next, the structure of a threshold computation apparatus will be explained.

Figure 2:
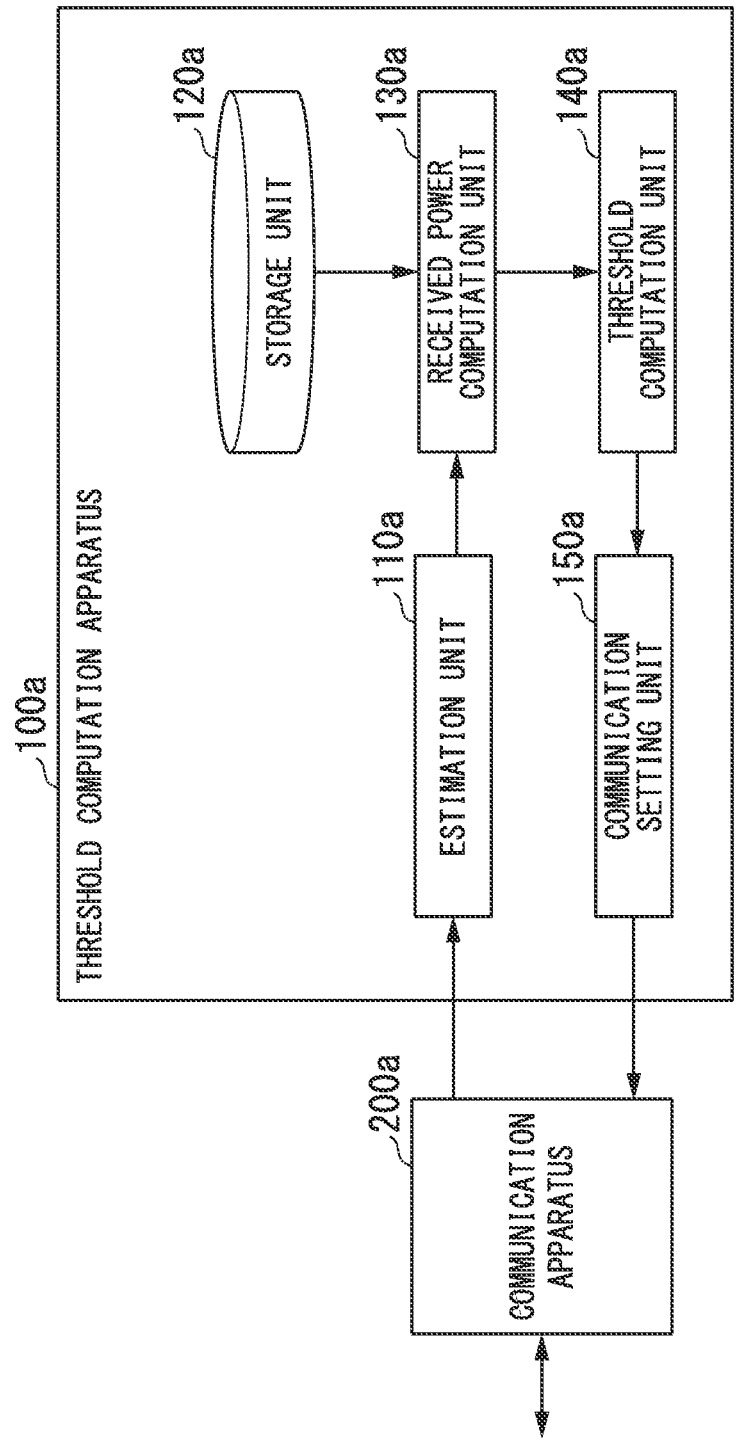
FIG. 2 is a diagram showing the structure of a threshold computation apparatus as the embodiment of the present invention.

FIG. 2 is a block diagram showing the structure of a threshold computation apparatus 100a which includes an estimation unit 110a, a storage unit 120a, a received power computation unit 130a, a threshold computation unit 140a, and a communication setting unit 150a. The threshold computation apparatus 100a are connected to a communication apparatus 200a in a manner such that they can communicate with each other.

The communication apparatus 200a receives a predetermined signal from the user terminal 400 by means of an uplink, that is, a communication link from the user terminal 400 to the present apparatus. The predetermined signal may be a DM-RS (Demodulation Reference Signal) that is a pilot signal for the uplink.

Based on the received predetermined signal, the communication apparatus 200a measures momentary interference power for the uplink, which will be called "measured interference power". The communication apparatus 200a outputs information, which indicates the measured interference power, to the estimation unit 110a.

In addition, predetermined information about the user terminal 400 is input from the communication setting unit 150a to the communication apparatus 200a. The predetermined information may be information which indicates received power computed by the received power computation unit 130a. The communication apparatus 200a sends the predetermined information (input from the communication setting unit 150a) to another base station.

When receiving measurement (MR) information from the user terminal 400 the communication apparatus 200a performs an operation which is associated with the received measurement information in advance. For example, if the communication apparatus 200a receives A2MR as measurement information and also receives a permission for handover from a base station of the destination for the handover, then the communication apparatus 200a sends information, which indicates the permission of the handover, to the user terminal 400 which sent the above A2MR.

In addition, the information which indicates the measured interference power is input into the estimation unit 110a from the communication apparatus 200a. Based on the received information which indicates the measured interference power, the estimation unit 110a estimates interference power for the uplink. Below, the interference power which is estimated is called "estimated interference power". The estimated interference power may be interference power for the uplink, which is caused by another user terminal which uses the same radio resources as those used by the present terminal.

The estimation unit 110a computes the estimated interference power by using a predetermined statistical method in which an arithmetic (simple) average within a statistical interval or a value of x % in a cumulative distribution within a statistical interval is determined in advance.

The estimation unit 110a may compute estimated interference power $P_I$ by using Formula (9):

$$\text{estimated interference power }(t)[\text{dBm}] = \alpha \times \text{estimated interference power }(t) + (1-\alpha) \times \text{estimated interference power }(t-1) \quad (9)$$

where t denotes a time at which the information that indicates the measured interference power is input into the estimation unit 110a, and a denotes a weighting coefficient.

Each interference power value in Formula (9) may be a logarithmic value or a true value.

Additionally, Formula (9) for estimating the estimated interference power $P_I$ is just an example. The estimated interference power may be estimated to be an average or a maximum value of measured interference power within a statistical interval, or a value of x % in a cumulative distribution of measured interference power within a statistical interval.

The estimation unit 110a outputs information which indicates the estimated interference power $P_I$ to the received power computation unit 130a regularly at a predetermined period (i.e., timing).

The storage unit 120a stores a required communication quality value (i.e., required received power) necessary for the uplink, in advance. The required communication quality value necessary for the uplink may be Signal-to-Interference-plus-Noise Ratio (SINR), Signal-to-Interference Ratio (SIR), or Reference Signal Received Quality (RSRQ).

Preferably, the required communication quality value necessary for the uplink is predetermined to be a value better than a communication quality value which causes an interruption of communication. For example, the communication quality value which causes an interruption of communication corresponds to a required error rate necessary for the uplink when one RB (resource block) is sent using MCS (Modulation and Cording Scheme) which indicates a combination of a minimum encoding rate and a modulation method.

The storage unit 120a stores a maximum value $P_{TX\_UL}$ [dBm] of transmission power of the user terminal, in advance. The maximum value $P_{TX\_UL}$ [dBm] may be a predetermined value, or a maximum or minimum value, an average, or a y % in a cumulative distribution, with respect to maximum values $P_{TX\_UL}$ of transmission power of respective user terminals which are accessing the relevant base station.

The storage unit 120a also stores a transmission power (value) $P_{TX\_DL}$ [dBm] for a downlink of the base station which has the threshold computation apparatus, in advance. When the relevant base station sends a pilot signal (CRS), the transmission power $P_{TX\_DL}$ may be transmission power of the pilot signal.

The storage unit 120a may store a noise power [dBm] at the base station having the threshold computation apparatus, in advance.

The received power computation unit 130a receives information which indicates the estimated interference power $P_I$ from the estimation unit 110a. The received power computation unit 130a also obtains from the storage unit 120a, (i) the required communication quality value (e.g., SINR) necessary for the uplink, (ii) the maximum value $P_{TX\_UL}$ of transmission power of the user terminal, and (iii) the transmission power $P_{TX\_DL}$ for the downlink of the relevant base station having the threshold computation apparatus.

There is the following relationship between SINR (Signal-to-Interference-plus-Noise Ratio: logarithmic value), received power $P_{RX}$ (logarithmic value), interference power $P_I$ (true value), and noise power PN (true value):

$$\text{SINR[dB]}=P_{RX}-10\log_{10}(P_I+P_N) \quad (10)$$

According to Formula (10), required received power $P_{RX\_UL}$ (logarithmic value), that is necessary for the uplink and satisfies required communication quality value $\text{SINR}_{UL}$ (also necessary for the uplink), is represented by Formula (11) using estimated interference power $P_{I\_UL}$ (true value) and noise power $P_{N\_UL}$ (true value):

$$P_{RX\_UL}=\text{SINR}_{UL}+10\log_{10}(P_{I\_UL}+P_{N\_UL}) \quad (11)$$

In addition, there is the following relationship between received power $P_{RX}$ (logarithmic value), transmission power $P_{TX}$ (logarithmic value), and path loss PL (logarithmic value).

$$P_{RX}=P_{TX}-PL \quad (12)$$

According to Formula (12), when transmission from the user terminal is performed using maximum transmission power $P_{TX\_UL}$, path loss PL' (i.e., transmission loss: logarithmic value) that satisfies the required received power $P_{RX\_UL}$ (logarithmic value) necessary for the uplink is represented by Formula (13):

$$PL'=P_{TX\_UL}-P_{RX\_UL} \quad (13)$$

If the uplink and the downlink have the same frequency band or frequency bands close to each other, the uplink and downlink have almost the same path loss. If it is assumed that the uplink and downlink have almost the same path loss, then based on Formula (12), received power $P_{RX\_DL}$ (logarithmic value) at the user terminal for the downlink, which satisfies the required communication quality value necessary for the uplink, is represented by Formula (14) using (i) path loss PL' (transmission loss: logarithmic value) that satisfies the required received power necessary for the uplink and (ii) transmission power $P_{TX\_DL}$ (logarithmic value) at the relevant base station (having the threshold computation apparatus) for the downlink:

$$P_{RX\_DL}=P_{TX\_DL}-PL' \quad (14)$$

Based on Formulas (12), (13), and (14), the received power computation unit 130a computes the received power $P_{RX\_DL}$ at the user terminal, and outputs information which indicates the computed received power $P_{RX\_DL}$ to the threshold computation unit 140a.

There is also the following relationship:

$$\begin{aligned}P_{RX\_DL} &= (P_{TX\_DL}-P_{TX\_UL})+P_{RX\_UL} \\ &= (P_{TX\_DL}-P_{TX\_UL})+\text{SINR}_{UL}+10\log_{10}(P_{I\_UL}+P_{N\_UL})\end{aligned} \quad (15)$$

The received power computation unit 130a may integrally handle the estimated interference power $P_I$ and the noise power $P_N$ on an assumption that estimated interference power includes noise power.

The threshold computation unit 140a receives the information, which indicates the computed received power $P_{RX\_DL}$ at the user terminal, from the received power computation unit 130a. The threshold computation unit 140a computes a threshold based on the information which indicates the computed received power $P_{RX\_DL}$ at the user terminal, and outputs information which indicates the computed threshold to the communication setting unit 150a.

In the following explanation, "s" denotes a base station which computes a threshold for received power, and "n" denotes a neighbor base station adjacent thereto, where the following threshold computation method is just an example.

The threshold computation unit 140a computes a1_Threshold, that is a threshold for A1 measurement (A1MR) information by using Formula (16):

$$a1\_\text{Threshold}=\text{"required received power at base station } s \text{ for downlink (information that indicates received power } P_{RX\_DL}\text{)"}-\text{"}Hys\text{(hysteresis) at base station } s\text{"} \quad (16)$$

The threshold computation unit 140a outputs the computed a1_Threshold to the communication setting unit 150a, as a threshold for the received power of the downlink, that is, a threshold used in comparison performed by the user terminal 400 so as to determine whether or not A1MR will be sent.

The threshold computation unit 140a also computes a2_Threshold, that is a threshold for A2 measurement (A2MR) information by using Formula (17):

$$a2\_\text{Threshold}=\text{"required received power at base station } s \text{ for downlink (information that indicates received power } P_{RX\_DL}\text{)"}+\text{"}Hys\text{(hysteresis) at base station } s\text{"} \quad (17)$$

The threshold computation unit 140a outputs the computed a2_Threshold to the communication setting unit 150a, as a threshold for the received power of the downlink, that is, a threshold used in comparison performed by the user terminal 400 so as to determine whether or not A2MR will be sent.

The threshold computation unit 140a may receive from a neighbor base station "information which indicates the computed received power $P_{RX\_DL}$ at the user terminal" computed by a threshold computation apparatus of the neighbor base station, and compute the threshold based on the received information which indicates the computed received power $P_{RX\_DL}$ at the user terminal.

Additionally, the threshold computation unit 140a computes a4_Threshold, that is a threshold for A4 measurement (A4MR) information by using Formula (18), where max_n indicates a function that outputs a maximum value by using obtained values (for arguments) relating to multiple neighbor base stations n:

$$a4\_Threshold = \max\_n(\text{"required received power at neighbor base station } n \text{ for downlink (information that indicates received power } P_{RX\_DL}\text{")} + \text{"Ocn used by base station } s \text{ with respect to neighbor base station } n\text{"} + \text{"Ofn at base station } s\text{"} - \text{"Hys at base station } s\text{"}) \quad (18)$$

The threshold computation unit 140a outputs the computed a4_Threshold to the communication setting unit 150a, as a threshold for the received power of the downlink, that is, a threshold used in comparison performed by the user terminal 400 so as to determine whether or not A4MR will be sent.

The threshold computation unit 140a also computes a5_Threshold1 and a5_Threshold2, that are thresholds for A5 measurement (A5MR) information by using Formulas (19) and (20):

$$a5\_Threshold1 = \text{"required received power at base station } s \text{ for downlink (information that indicates received power } P_{RX\_DL}\text{")} + \text{"Hys at base station } s\text{"} \quad (19)$$

$$a5\_Threshold2 = \max\_n(\text{"required received power at neighbor base station } n \text{ for downlink (information that indicates received power } P_{RX\_DL}\text{")} + \text{"Ocn used by base station } s \text{ with respect to neighbor base station } n\text{"} + \text{"Ofn at base station } s\text{"} - \text{"Hys at base station } s\text{"}) \quad (20)$$

The threshold computation unit 140a outputs the computed a5_Threshold1 and a5_Threshold2 to the communication setting unit 150a, as thresholds for the received power of the downlink, that is, thresholds used in comparison performed by the user terminal 400 so as to determine whether or not A5MR will be sent.

In addition, the threshold computation unit 140a computes b1_Threshold, that is a threshold for B1 measurement (B1MR) information by using Formula (21):

$$b1\_Threshold = \max\_n(\text{"required received power at neighbor base station } n \text{ for downlink (information that indicates received power } P_{RX\_DL}\text{")} + \text{"Ofn at base station } s\text{"} - \text{"Hys at base station } s\text{"}) \quad (21)$$

The threshold computation unit 140a outputs the computed b1_Threshold to the communication setting unit 150a, as a threshold for the received power of the downlink, that is, a threshold used in comparison performed by the user terminal 400 so as to determine whether or not B1MR will be sent.

The threshold computation unit 140a also computes b2Threshold1 and b2_Threshold2, that is thresholds for B2 measurement (B2MR) information by using Formulas (22) and (23):

$$b2\_Threshold1 = \text{"required received power at base station } s \text{ for downlink (information that indicates received power } P_{RX\_DL}\text{")} + \text{"Hys at base station } s\text{"} \quad (22)$$

$$b2\_Threshold2 = \max\_n(\text{"required received power at neighbor base station } n \text{ for downlink (information that indicates received power } P_{RX\_DL}\text{")} + \text{"Ofn at base station } s\text{"} - \text{"Hys at base station } s\text{"}) \quad (23)$$

The threshold computation unit 140a outputs the computed b2_Threshold1 and b2_Threshold2 to the communication setting unit 150a, as thresholds for the received power of the downlink, that is, thresholds used in comparison performed by the user terminal 400 so as to determine whether or not B2MR will be sent.

The communication setting unit 150a receives each threshold for received power for the downlink from the threshold computation unit 140a. In accordance with predetermined communication procedure and communication format (which may be based on LTE), the communication setting unit 150a outputs predetermined information (including each threshold for received power of the downlink) to the communication apparatus 200a.

As described above, the threshold computation apparatus 100a includes the received power computation unit 130a which:

(a) obtains (i) estimated interference power $P_I$ (and noise power $P_N$), that is, an estimated value of interference power for the uplink as a communication link from the user terminal 400 to the base station 300a, (ii) predetermined communication quality value $SINR_{UL}$ necessary for the uplink, (iii) maximum value $P_{TX\_UL}$ of transmission power of the user terminal 400, and (iv) transmission power $P_{TX\_DL}$ of the base station 300a for the downlink as a communication link from the base station 300a to the user terminal 400;

(b) subtracts the maximum value $P_{TX\_UL}$ (logarithmic value) of transmission power of the user terminal 400 from the transmission power $P_{TX\_DL}$ (logarithmic value) of the base station 300a for the downlink;

(c) adds the communication quality value $SINR_{UL}$ (logarithmic value) and the estimated interference power $P_I$ (and noise power $P_N$) (logarithmic value) to the result of the above subtraction; and (d) determines the result of the addition to be the received power $P_{RX\_DL}$ (logarithmic value) at the user terminal 400.

The threshold computation apparatus 100a also includes the threshold computation unit 140a that computes each threshold (Threshold) based on the received power $P_{RX\_DL}$ (logarithmic value) at the user terminal 400 and predetermined conditions.

According to such a structure, the received power at a terminal for the downlink is computed based on a communication quality value required for the uplink, so that the threshold computation unit can compute an appropriate threshold, which can reduce the occurrence of an interruption of communication.

Additionally, the threshold computation unit 140a sends the user terminal 400 via the communication setting unit 150 and the communication apparatus 200a, each threshold used for determining whether or not the user terminal 400 sends information to the base station 300a, where the information is used in a determination as to whether or not a handover process is executed.

Accordingly, the threshold computation apparatus can compute each threshold which can reduce the occurrence of an interruption of communication due to a failure in the handover process.

In addition, a computer executes a procedure which includes:

(a) obtaining (i) estimated interference power $P_I$ (and noise power $P_N$), that is, an estimated value of interference power for the uplink as a communication link from the user terminal 400 to the base station 300a, (ii) predetermined communication quality value $SINR_{UL}$ necessary for the uplink, (iii) maximum value $P_{TX\_UL}$ of transmission power of the user terminal 400, and (iv) transmission power $P_{TX\_DL}$ of the base station 300a for the downlink as a communication link from the base station 300a to the user terminal 400;

(b) subtracting the maximum value $P_{TX\_UL}$ (logarithmic value) of transmission power of the user terminal 400 from the transmission power $P_{TX\_DL}$ (logarithmic value) of the base station 300a for the downlink;

(c) adding the communication quality value $SINR_{UL}$ (logarithmic value) and the estimated interference power $P_I$ (and noise power $P_N$) (logarithmic value) to the result of the above subtraction; and (d) determining the result of the addition to be the received power $P_{RX\_DL}$ (logarithmic value) at the user terminal 400.

The computer also executes a process of computing each threshold (Threshold) based on the received power $P_{RX\_DL}$ (logarithmic value) at the user terminal 400 and predetermined conditions.

According to such a structure, the received power at a terminal for the downlink is computed based on a communication quality value required for the uplink, so that the computer can compute an appropriate threshold, which can reduce the occurrence of an interruption of communication.

Second Embodiment

A second embodiment of the present invention will be described in detail with reference to the drawings. In the second embodiment, a threshold used (for cell selection) by the user terminal to select a base station to which the user terminal used should access will be explained. In the following explanations, only distinctive parts in comparison with the first embodiment will be described.

In a radio communication system based on LTE, if a handover process is failed, or if received power or a communication quality value of a pilot signal for the downlink is degraded, then cell selection is performed by the user terminal.

Below, an example of a condition for a determination performed when the user terminal selects a base station (i.e., cell) will be shown, where the user terminal selects a base station which satisfies the condition:

$$(Srxlev>0) \text{ and } (Squal>0) \quad (24)$$

where:

$$Srxlev = Qrxlevmeas - (Qrxlevmin + Qrxlevminoffset) - Pcompensation \quad (25)$$

$$Squal = Qqualmeas - (Qqualmin + Qqualminoffset) \quad (26)$$

In the above formulas, Qrxlevmeas denotes received power (RSRP) of a pilot signal for the downlink; Qrxlevmin denotes lower-limit received power required for the downlink; Qrxlevminoffset denotes an offset value associated with Qrxlevmin; and Pcompensation denotes a corrective value represented by Formula (27):

$$Pcompensation = \max(P\_EMAX\_H - P\_PowerClass, 0) \quad (27)$$

where P_EMAX_H denotes a maximum value of transmission power of the user terminal, which is communicated from an upper layer; and P_PowerClass denotes a maximum value of transmission power based on a band allocated for the user terminal within the relevant radio range.

In addition, Qqualmeas denotes a communication quality value (RSRQ) of the pilot signal for the downlink; Qqualmin denotes a lower-limit communication quality value required for the downlink; and Qqualminoffset denotes an offset value associated with Qqualmin.

The above Qrxlevmeas and Qqualmeas values are measured by the user terminal, and Pcompensation is computed by the user terminal. Additionally, the Qrxlevmin, Qrxlevminoffset, Qqualmin, and Qqualminoffset values are sent from the relevant base station to the user terminal.

A constituent "Qrxlevmin+Qrxlevminoffset" of the above threshold Srxlev is computed by Formula (28):

$$Qrxlevmin + Qrxlevminoffset = \text{required received power necessary for the downlink of base station } s \quad (28)$$

The threshold computation unit 140a outputs the required received power necessary for the downlink to the communication setting unit 150a, more specifically, outputs the value of "Qrxlevmin+Qrxlevminoffset" as a constituent of the threshold used in the relevant comparison performed by the user terminal 400 for the cell selection.

That is, the threshold computation unit 140a outputs the constituent "Qrxlevmin+Qrxlevminoffset" of the threshold, which is used in a determination as to whether or not the target base station 300b for accessing should be selected by the user terminal 400 to the user terminal 400 via the communication setting unit 150a and the communication apparatus 200a.

According to the above structure, the user terminal can select a base station which satisfies a required communication quality (corresponding to required received power) necessary for the uplink. That is, the threshold computation apparatus can compute a threshold which can reduce the occurrence of an interruption of communication due to a failure in cell selection.

Third Embodiment

A third embodiment of the present invention will be described in detail with reference to the drawings. In the third embodiment, a threshold used in a determination as to whether or not different band search or different system search should be executed by the user terminal will be explained. In the different band search, the user terminal searches for (presence of) a band different from the frequency band which the relevant access base station is using. In the different system search, the user terminal examines whether or not communication using a method different from the communication method (e.g., LTE) of the access base station is performed in a peripheral area. In the following explanations, only distinctive parts in comparison with the first and second embodiments will be described.

In a radio communication system using LTE, the base station sends an instruction to execute the different band search or different system search, to the user terminal. When receiving this instruction, the user terminal measures received power or a communication quality value for a different band or system, and sends measurement information (i.e., measured result) to the relevant base station.

In consideration of power consumption of the user terminal, it is not preferable to always execute such different band search or different system search. Therefore, when receiving A2MR from the user terminal, the communication apparatus 200a sends an instruction to execute the different band search or different system search, to the user terminal, where A2MR is measurement information which indicates that the received power (RSRP) or the communication quality value (RSRQ) for communication with the access base station has decreased below a specific value. In addition, when receiving A1MR from the user terminal, the communication apparatus 200a may send an instruction to terminate the different band search or different system search, to the user terminal.

As described above, the threshold computation unit 140*a* sends a threshold to the user terminal 400 via the communication setting unit 150*a* and the communication apparatus 200*a*, where the threshold is used in a determination as to whether or not the user terminal 400 sends base station 300*a* information that is used in a determination as to whether or not a different system or frequency band should be searched for by the terminal.

When there are multiple peripheral base stations which use the same frequency band or the same system, only the communication quality for each uplink may be degraded while the communication quality for each downlink is upgraded. Even in such a case, the user terminal 400 sends the base station 300*a* the above information (used in the determination as to whether or not the different band or system search should be performed) based on a threshold in accordance with the communication quality for the uplink. Therefore, the threshold computation apparatus can compute, before the execution of the band or system search, a threshold which can reduce the occurrence of an interruption of communication.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, the radio communication system relating to the present invention is not limited to a system using LTE.

In addition, a fixed offset value as a margin may be further added to each threshold.

Additionally, the threshold computation apparatus may be provided at a base station managing server which is a superior apparatus than each base station. In this case, each base station and the superior base station managing server are connected to each other in a communicable manner via a communication line (network).

A program for implementing the above-described threshold computation apparatus may be stored in a computer readable storage medium, and the program stored in the storage medium may be loaded and executed on a computer system. Here, the computer system may have hardware resources which include an OS, peripheral devices, and the like.

The above computer readable storage medium is a storage device, for example, a portable medium such as a flexible disk, magneto optical disk, ROM, or CD-ROM, or a memory device such as a hard disk built in a computer system.

The computer readable storage medium also covers a device for temporarily storing the program, such as a volatile storage medium (RAM) in a computer system which functions as a server or client in program transmission via a network (e.g., the Internet) or a communication line (e.g., a telephone line).

The above program, stored in a memory device of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such as (e.g., a telephone line).

In addition, the program may execute a part of the above-explained functions. The program may also be a "differential" program so that the above-described functions can be executed by a combination program of the differential program and an existing program which has already been stored in the relevant computer system.

What is claimed is:

1. A threshold computation apparatus comprising:
    an estimator configured to compute and output estimated interference power that is an estimated value of interference power for an uplink as a communication link from a terminal to a base station;
    a storage unit configured to store a predetermined communication quality value necessary for the uplink, a maximum value of transmission power of the terminal, and transmission power of the base station for a downlink as a communication link from the base station to the terminal;
    a received power computation unit that is connected to the estimator and the storage unit, configured to:
        obtain the estimated interference power from the estimator; the predetermined communication quality value; the maximum value of transmission power of the terminal; and the transmission power of the base station from the storage;
        subtract a logarithmic value of the maximum value of the transmission power of the terminal from a logarithmic value of the transmission power of the base station for the downlink; adds a logarithmic value of the communication quality value and a logarithmic value of the estimated interference power to a result of the subtraction; and
    determine a result of the addition to be a logarithmic value of received power at the terminal; and
    a threshold computation unit that is connected to the received power computation unit and configured to compute a threshold based on the logarithmic value of the received power at the terminal and a predetermined condition.

2. The threshold computation apparatus in accordance with claim 1, wherein: the threshold computation unit sends the threshold via a communication apparatus to the terminal, where the threshold is used in a determination as to whether or not the terminal will send the base station, information necessary for a determination as to whether or not a handover process should be executed.

3. The threshold computation apparatus in accordance with claim 1, wherein: the threshold computation unit sends the threshold via a communication apparatus to the terminal, where the threshold is used in a determination as to whether or not the terminal will select a base station which the terminal accesses.

4. The threshold computation apparatus in accordance with claim 1, wherein: the threshold computation unit sends the threshold via a communication apparatus to the terminal, where the threshold is used in a determination as to whether or not the terminal will send the base station, information used in a determination as to whether or not a different system or a different frequency band should be searched for by the terminal.

5. A non-transitory computer-readable storage medium which stores a threshold computation program that makes a computer execute:
    a received power computation process that:
        obtains estimated interference power that is an estimated value of interference power for an uplink as a communication link from a terminal to a base station; a predetermined communication quality value necessary for the uplink; a maximum value of transmission power of the terminal; and transmission power of the base station for a downlink as a communication link from the base station to the terminal;

subtracts a logarithmic value of the maximum value of the transmission power of the terminal from a logarithmic value of the transmission power of the base station for the downlink;

adds a logarithmic value of the communication quality value and a logarithmic value of the estimated interference power to a result of the subtraction; and determines a result of the addition to be a logarithmic value of received power at the terminal; and a threshold computation process that computes a threshold based on the logarithmic value of the received power at the terminal and a predetermined condition.

* * * * *